United States Patent
Sabin et al.

(10) Patent No.: US 10,478,015 B2
(45) Date of Patent: Nov. 19, 2019

(54) SELF-HEATING ASSEMBLY WITH DISTRIBUTED REACTANT

(71) Applicant: Tempra Technology, Inc., Bradenton, FL (US)

(72) Inventors: Cullen M. Sabin, Bradenton, FL (US); Alan James Maskell, Venice, FL (US); Michael Sheppard Bolmer, Maple Grove, MN (US)

(73) Assignee: Tempra Technology, Inc., Brandenton, FL (US)

( * ) Notice: Subject to any disclaimer, the term of this patent is extended or adjusted under 35 U.S.C. 154(b) by 535 days.

(21) Appl. No.: 15/076,996

(22) Filed: Mar. 22, 2016

(65) Prior Publication Data
US 2016/0338530 A1 Nov. 24, 2016

Related U.S. Application Data

(60) Provisional application No. 62/139,116, filed on Mar. 27, 2015.

(51) Int. Cl.
- *A47J 36/28* (2006.01)
- *F24V 30/00* (2018.01)
- *B65D 81/34* (2006.01)

(52) U.S. Cl.
CPC .......... *A47J 36/28* (2013.01); *B65D 81/3484* (2013.01); *F24V 30/00* (2018.05)

(58) Field of Classification Search
CPC .......... A47J 36/28; B65D 81/3484; F24J 1/00
See application file for complete search history.

(56) References Cited

U.S. PATENT DOCUMENTS

| 3,683,889 A | 8/1972 | Hoffman |
| 3,874,557 A | 4/1975 | Porter |

(Continued)

FOREIGN PATENT DOCUMENTS

| CA | 2095706 A1 * | 11/1994 | ............... A47J 36/28 |
| DE | 2715368 | 11/1977 | |

(Continued)

OTHER PUBLICATIONS

International Search Report and Written Opinion for PCT/US16/23527.

(Continued)

*Primary Examiner* — Kenneth Rinehart
*Assistant Examiner* — Logan P Jones
(74) *Attorney, Agent, or Firm* — Sheehan Phinney Bass & Green PA (57) ABSTRACT

A self-heating assembly includes a product container for holding a product to be heated and a heater container coupled to the product container. There is a reaction space between the product container and the heater container. There is a support structure (made, for example, of open cell foam) in the reaction space and a granular second reactant distributed throughout the support structure. There is a liquid first reactant in the reaction space. A frangible membrane is configured so that, when intact, it separates the liquid first reactant from the support structure and from the granular second reactant. The liquid first reactant and the granular second reactant are adapted to exothermically react upon contact with one another. The support structure is permeable to the liquid first reactant and is configured to support and substantially maintain the distribution of the granular second reactant throughout the support structure before and during the exothermic chemical reaction.

25 Claims, 8 Drawing Sheets

(56) References Cited

U.S. PATENT DOCUMENTS

| | | | | |
|---|---|---|---|---|
| 4,331,731 A | * | 5/1982 | Seike | A43B 7/02 |
| | | | | 428/305.5 |
| 4,809,673 A | * | 3/1989 | Charvin | B65D 81/3484 |
| | | | | 126/263.08 |
| 5,443,056 A | * | 8/1995 | Smith | B29C 65/247 |
| | | | | 126/263.05 |
| 6,484,514 B1 | * | 11/2002 | Joseph | B65D 81/3266 |
| | | | | 62/4 |
| 2007/0131248 A1 | * | 6/2007 | McKechnie | A47L 13/17 |
| | | | | 134/6 |
| 2008/0017184 A1 | | 1/2008 | Marshall et al. | |
| 2011/0188787 A1 | * | 8/2011 | Cho | B65D 81/3484 |
| | | | | 383/104 |
| 2013/0276772 A1 | * | 10/2013 | Ota | B32B 27/18 |
| | | | | 126/263.05 |
| 2014/0014088 A1 | | 1/2014 | Young | |

FOREIGN PATENT DOCUMENTS

| | | |
|---|---|---|
| DE | 3642312 | 6/1988 |
| EP | 2826721 | 5/2016 |

OTHER PUBLICATIONS

Extended European Search Report in application 16773749.3, dated Aug. 17, 2018.

* cited by examiner

SELF-HEATING ASSEMBLY WITH DISTRIBUTED REACTANT

CROSS-REFERENCE TO RELATED APPLICATION(S)

This application claims the benefit of priority to U.S. Provisional Patent Application No. 62/139,116, entitled, Self-Heating Tray Assembly, which was filed on Mar. 27, 2015. The disclosure of the prior application is incorporated by reference herein in its entirety.

BACKGROUND

This disclosure relates to a self-heating assembly of the type in which an exothermic chemical reaction occurs between two chemicals: a liquid reactant and a granular reactant.

SUMMARY OF THE INVENTION

In one aspect, a self-heating assembly includes a product container for holding a product to be heated (e.g., a food product) and a heater container coupled to the product container. There is a reaction space between the product container and the heater container. There is a support structure (made, for example, of open cell foam) in the reaction space and a granular second reactant distributed throughout the support structure. There is a liquid first reactant in the reaction space. A frangible membrane is configured so that, when intact, it separates the liquid first reactant from the support structure and from the granular second reactant. The liquid first reactant and the granular second reactant are adapted to exothermically react upon contact with one another. The support structure is permeable to the liquid first reactant and is configured to support and substantially maintain the distribution of the granular second reactant throughout the support structure before and during the exothermic chemical reaction.

In a typically implementation, the product container and the heater container have substantially similar shapes. For example, in some implementations, the product container and the heater container are substantially tray-shaped (e.g., a circular or rectangular, relatively flat and shallow with a raised rim). As another example, in some implementations, the product container and the heater container are substantially bowl-shaped (e.g., a circular or rectangular, somewhat deeper, concave shape). As yet another example, in some implementations, the product container and the heater container are substantially plate-shaped (e.g., a circular or rectangular, relatively flat shape, perhaps with only slightly raised edges). Variations of these shapes and, of course, other shapes are possible as well. Moreover, the product container and the heater container need not necessarily have substantially similar shapes. Indeed, in some implementations, the product container may have a substantially different shape than the heater container.

In some implementations, one or more of the following advantages are present.

For example, in a typical implementation, being suspended in and/or supported by the support structure can help ensure that the granular second reactant will remain in place, dispersed, with substantial uniformity throughout the support structure, even if the self-heating tray assembly is jostled, placed on its side, or even upside down during shipping and/or handling. This helps ensure that, when operated, substantially uniform heating occurs across the entire product tray.

Thus, self-heating assemblies, such as those described herein can be highly reliable and provide very even heating of the product contained therein.

Other features and advantages will be apparent from the description and drawings, and from the claims.

BRIEF DESCRIPTION OF THE DRAWINGS

Like reference characters refer to like elements.

DETAILED DESCRIPTION

Figure 5:
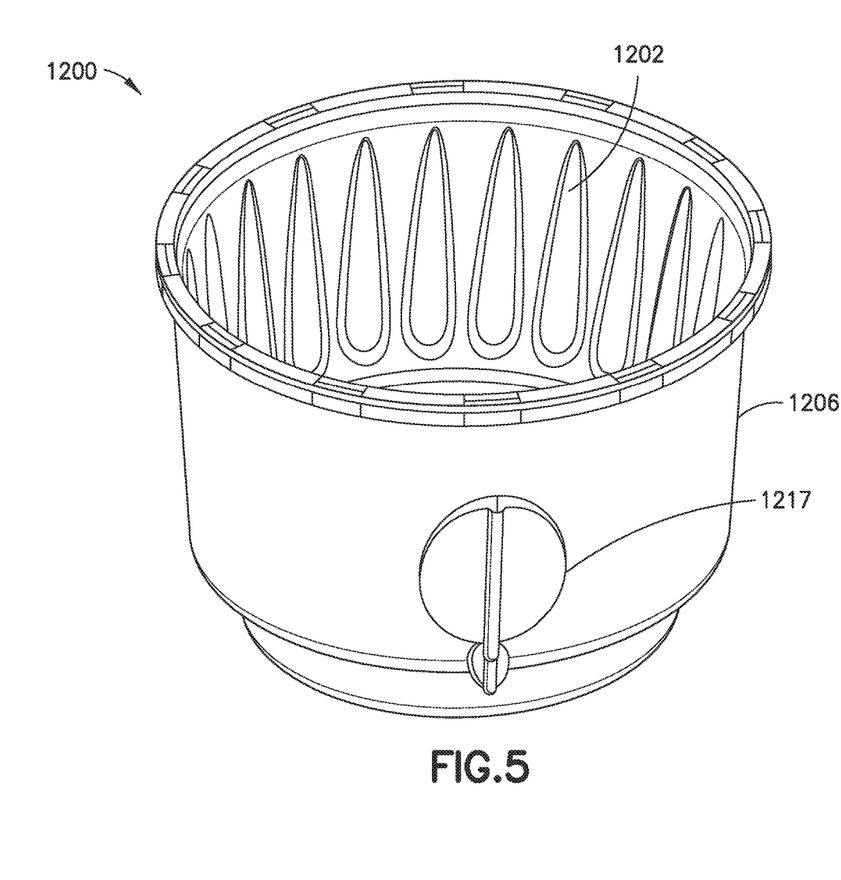
FIG. 5 is a perspective view of yet another exemplary self-heating assembly.
Figure 6:
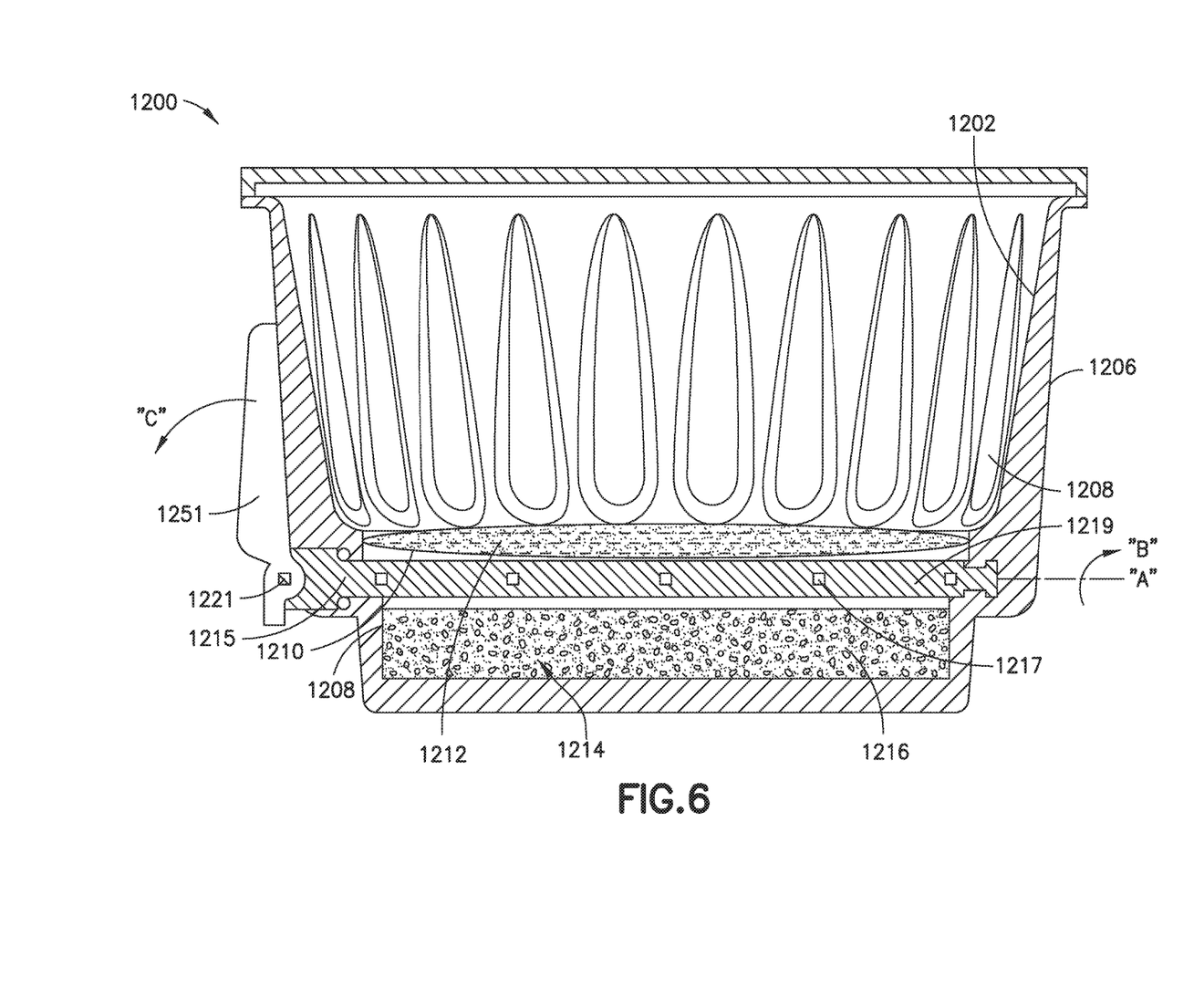
FIG. 6 is a cross-sectional view of the exemplary self-heating assembly of FIG. 5.
Figure 7:
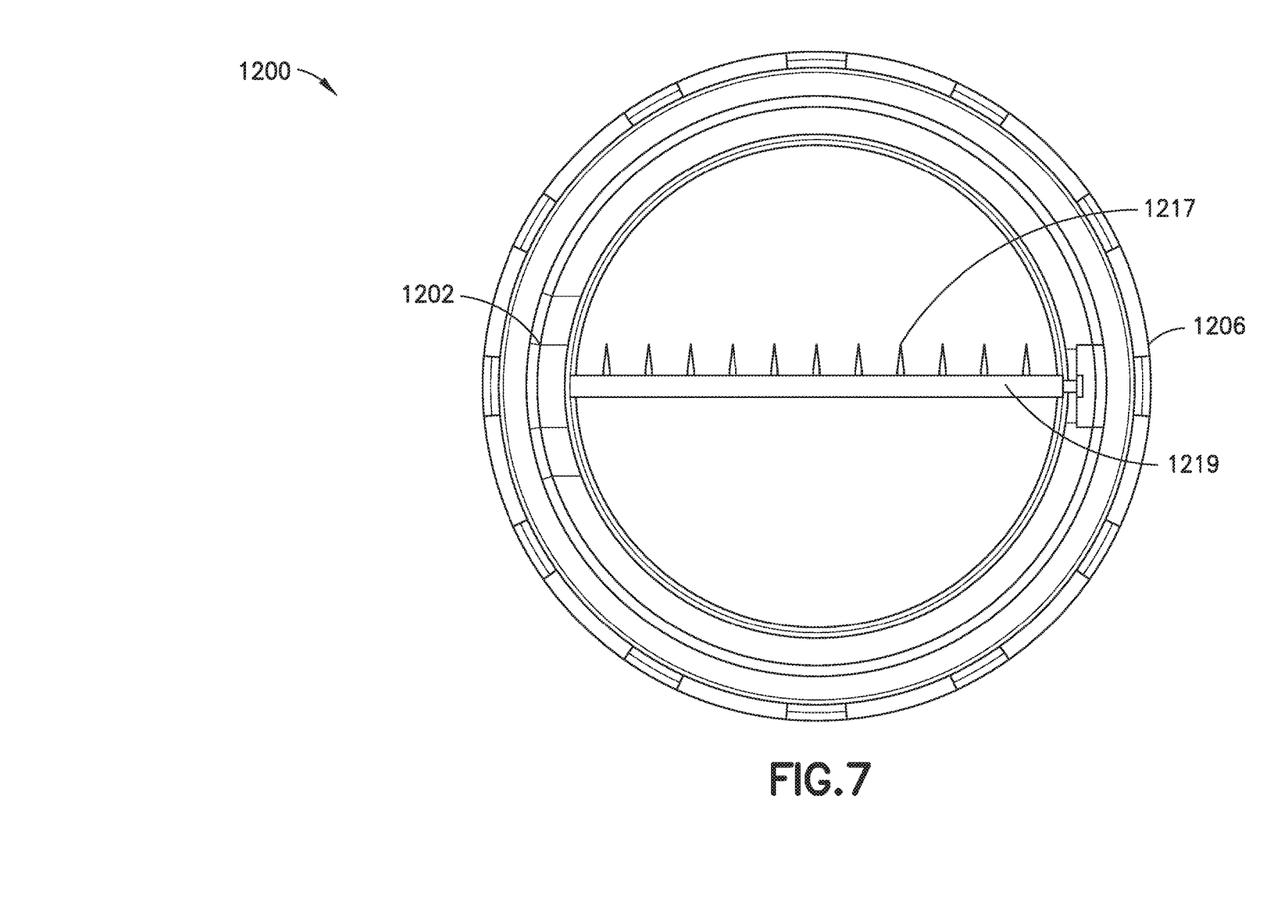
FIG. 7 is a top sectional view of the exemplary self-heating assembly of FIG. 5.

FIGS. 5-7 show an implementation of a self-heating assembly 1200.

The illustrated assembly 1200 has two nested trays: a product tray 1202 for holding a product to be heated (not shown) and a heater tray 1206 coupled to the product tray 1202. Collectively, the product tray 1202 and the heater tray 1206 define a reaction space 1208 between them. During operation, the reaction space 1208 accommodates an exothermic chemical reaction, the heat from which is used to increase the temperature of the product contained within the product tray 1202. The product tray 1202 in the illustrated assembly 1200 is and remains stationary relative to the heater tray 1206 throughout heating operations of the self-heating assembly 1200.

Within the reaction space 1208, beneath the product tray 1202, there is a frangible container 1210 (e.g., a container made of a frangible material, such as plastic or the like) that contains a liquid first reactant 1212 (e.g., a fuel) and a support structure 1214 that contains a granular second reactant (e.g., an oxidizing agent) below the frangible container 1210. In a typical implementation, the liquid first reactant 1212 and the granular second reactant 1216 are adapted to react exothermically if and when they come into contact with each other.

Generally speaking, to activate the heating functionality of the illustrated assembly 1200, the frangible container 1210 is ruptured (e.g., pierced) and the liquid first reactant 1212 (e.g., fuel) is allowed to flow, by gravity, into the support structure 1214, mix with the granular second reactant 1216 (e.g., permanganate), thereby initiating an exothermic chemical reaction.

The support structure 1214 can take any one of a variety of different forms. For example, in various implementations, the support structure 1214 can be an open cell foam, a non-woven material such as felt, a filter pad, a quilted tea bag material, deep flocking, a water-permeable honeycomb, deep-pile carpet, short lengths of tubing packed tightly together, a layered mass of tissue paper (e.g., with granules packed between layers), etc. In some implementations, including the one shown in FIGS. 5-7, the support structure 1214 is open cell foam.

Typically, as shown, the support structure 1214 substantially fills an entire bottom portion of the reaction space 1208 (e.g., extending from wall to wall inside the reaction space 1208). The granular second reactant 1216 is generally distributed throughout the support structure 1214, typically, with substantial degree of uniformity so that any resulting exothermic reaction between the granular second reactant 1216 and the liquid first reactant 1212 will produce a substantially uniform amount of heat across the entire bottom of the reaction space 1208. The relatively large amount of surface area where the exothermic reaction takes place in the illustrated assembly 1200 facilitates substantially uniform heating of the product within the product tray 1202.

The support structure 1214 is permeable to the liquid first reactant 1212 and typically is configured to support and substantially maintain the relatively uniform distribution of granular second reactant 1216 before and during the exothermic chemical reaction. Thus, in a typical implementation, the support structure 1214 helps ensure that substantially uniform (or desired) heating takes place, even if the self-heating assembly 1200 has been jostled about, for example, during shipping and/or handling prior to activation of the heating functionality. Moreover, typically, the support structure 1214 substantially restricts movement of the granular second reactant 1216 across the bottom portion of the reaction space during the exothermic reaction, thereby further ensuring substantially uniform heating of the product to be heated.

In a typical implementation, some of the granules are held in place by the support structure itself. For example, in the case of open cell foam, some of the granules may be wedged inside the open cells of the foam and held in place by virtue of being so wedged. Additionally, in a typical implementation, prior to heater activation, the support structure 1214 is in close physical contact with its surrounding components (e.g., the side walls of the heater tray 1206, etc.). This sort of arrangement can help prevent any loose granules (e.g., ones that are not tightly held in place by the support structure 1214 itself) from migrating around within the self-heating assembly (e.g., above, below or on the sides of the support structure 1214).

A cutting element 1215 extends diametrically across a bottom portion of the reaction space 1208. The cutting element 1215 in the illustrated example includes a handle (knob) 1217 that is exposed at an external surface of the illustrated assembly 1200 for manipulation by a user to initiate heating of the product inside the product tray 1202, and a shaft 1219—with a plurality of cutting blades 1217 attached to it—that is attached to and extends from the handle 1251 inside the assembly 1200. In a typical implementation, the shaft 1219 will extend at least partially across the reaction space between the frangible container and the support structure. More particularly, in the illustrated example, the shaft 1219 extends through a space in the reaction space 1208 beneath the frangible container 1210 and above the support structure 1214 that contains the granular second reactant.

The cutting blades 1217 are configured, such that, when the shaft 1219 is rotated about axis "A," they press against, and eventually cut through or rupture the frangible container 1210, thereby, releasing the liquid first reactant 1212. In a typical implementation, all of the cutting blades 1217 extend from the shaft 1219 in the same direction (e.g., one that is substantially perpendicular to a longitudinal axis of the shaft 1219). Moreover, in a typical implementation, the shaft 1219 is supported so that it can rotate about its longitudinal axis (labeled "A" in FIG. 6). For example, in some implementations, the shaft 1219 is supported at both ends (e.g., by bearings or the like) in a manner that allows it to be rotated about its longitudinal axis "A" if and when the handle 1251 is rotated by a user.

In an inactivated state, the cutting blades 1217 are positioned so that they do not pose any significant risk of compromising the physical integrity of the frangible container 1210. For example, in some implementations, in the inactivated state, all of the cutting blades 1217 lie in a plane that is substantially parallel to both the frangible container 1210 and the support structure 1214 that contains the granular second reactant. In FIG. 6, for example, the cutting blades are shown in this inactivated state, extending out from the page, substantially parallel to both the frangible container 1210 and the support structure 1214 that contains the granular second reactant, where they pose no risk of compromising the physical integrity of the frangible container 1210 above it.

To activate the heating functionality in the illustrated assembly, a user would manipulate the handle 1251 to cause the shaft 1219 to rotate about axis "A" in the direction indicated by arrow "B." This would cause the cutting blades 1217 to move into, and eventually cut or rupture the frangible container 1210. In the illustrated example, to manipulate the handle in this way, the user might first lower the handle 1251 to an activating position (e.g., by swinging the handle about hinge 1221) and then rotating the handle about the axis "A" in the direction indicated by arrow "B" and then rotating the handle.

In an exemplary implementation, the first liquid reactant is or contains a fuel (e.g., a polyol fuel, such as ethylene glycol or glycerol) and the second granular reactant is or contains an oxidizing agent (e.g., alkali metal permanganate, for example, potassium permanganate). In some exemplary implementations, the first liquid reactant is or contains water and the second granular reactant is or contains calcium oxide. Any set of reactants may be used, as long as one is a liquid or slurry that can flow through the support structure 1214 and the other is a solid, or is contained in a solid, such that it can be supported, while its motion is substantially restricted, by support structure 1214.

Figure 8:
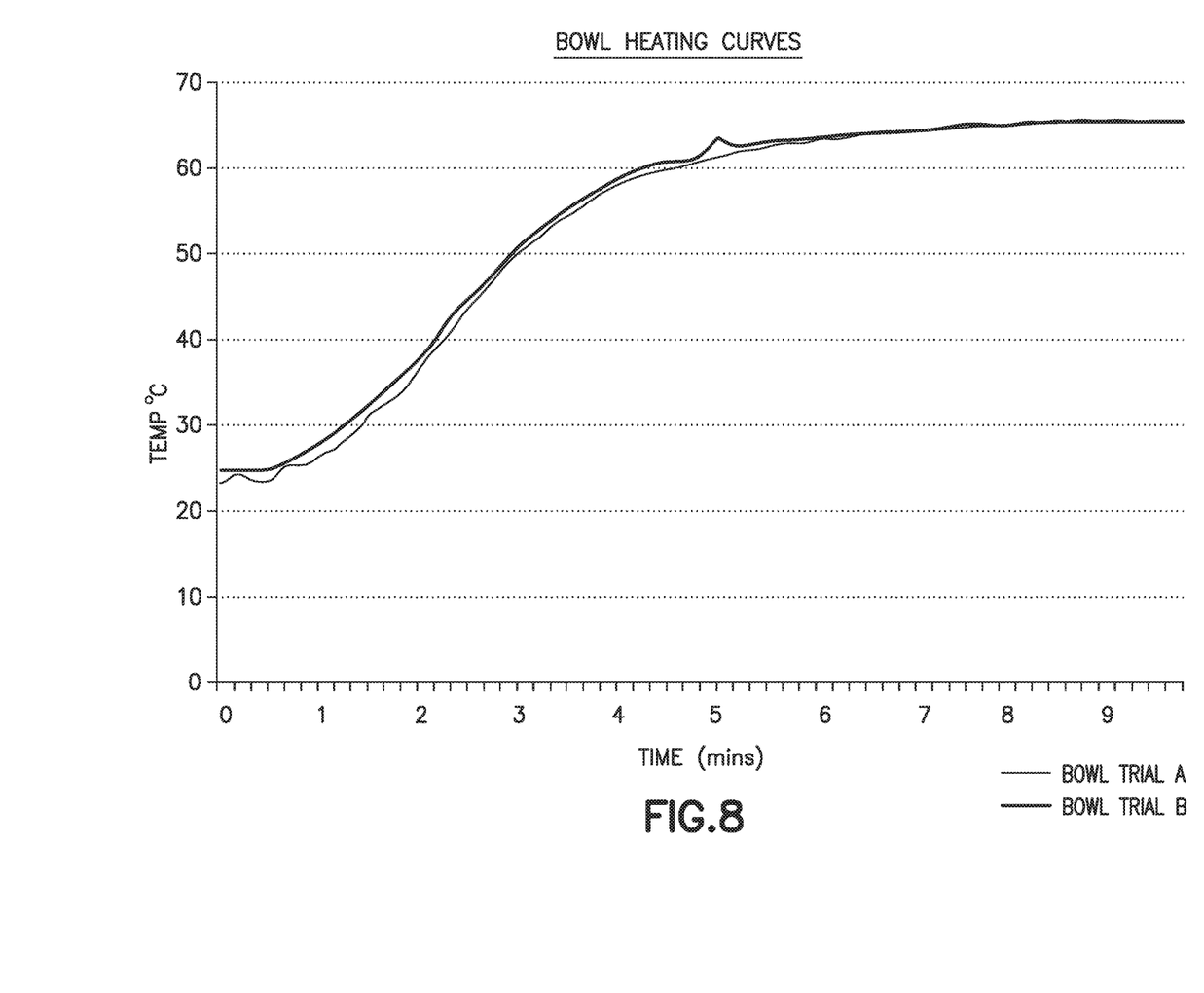
FIG. 8 is a plot of temperature over time showing two heating curves for exemplary self-heating assemblies.

FIG. 8 is a plot of temperature over time showing two heating curves for exemplary self-heating assemblies (bowls), similar to the heating assembly 1200 shown in FIGS. 5-7. In the illustrated plot, it can be seen that the product in each exemplary self-heating assemblies was able to reach close to its maximum temperature within about 5 minutes and stayed at that maximum temperature for at least 4 additional minutes.

Figure 1:
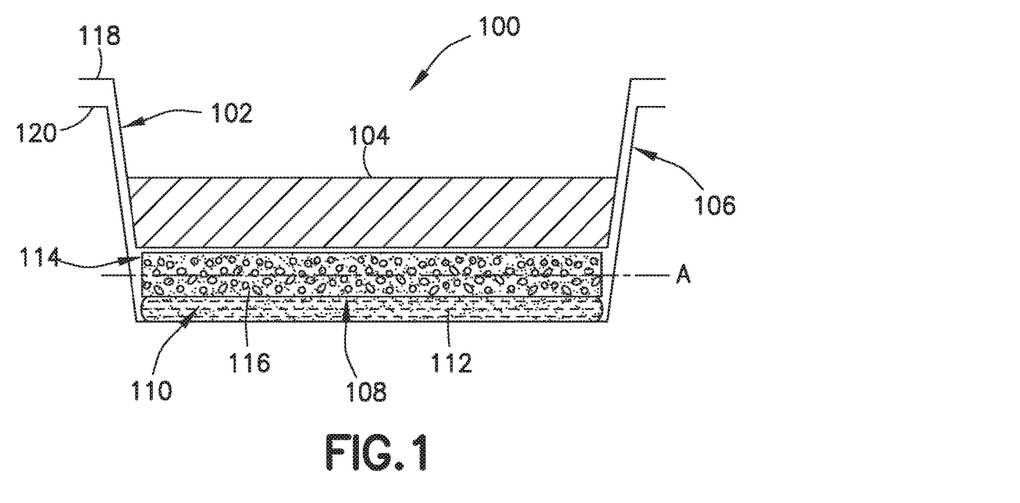
FIG. 1 is a cross-sectional side view of an exemplary self-heating assembly.

FIG. 1 is a schematic cross-sectional side view of another exemplary self-heating assembly 100.

Like the assembly 1200 in FIGS. 5-7, the assembly 100 in FIG. 1 has two nested trays: a product tray 102 for holding a product 104 to be heated and a heater tray 106 coupled to the product tray 102. Collectively, the product tray 102 and the heater tray 106 define a reaction space 108 between them. During operation, the reaction space 108 accommodates an exothermic chemical reaction, the heat from which is used to increase the temperature of the product 104 contained within the product tray 102. The product tray 102 in the illustrated assembly 100 is movable in a downward direction relative to the heater tray 106 to reduce the volume within the reaction space 108.

In the reaction space 108, there is a frangible container 110 (e.g., made of a frangible membrane material) that contains a liquid first reactant 112 and a support structure 114 that contains a granular second reactant 116 above the frangible container 110. In a typical implementation, the liquid first reactant 112, which may be a fuel, and the granular second reactant 116, which may be an oxidizing agent, are adapted to react exothermically when they come into contact with each other.

The granular second reactant is generally distributed throughout the support structure 114, typically with a high degree of uniformity so that the exothermic reaction between the granular second reactant 116 and the liquid first reactant 112 will heat the product contained in the self-heating assembly 100 with substantial uniformity. The support structure 114 is permeable to the liquid first reactant 112 and is configured to support and substantially maintain the distribution of granular second reactant 116 throughout the support structure before and during the exothermic chemical reaction.

In a typical implementation, the support structure 114 helps ensure that substantially uniform heating (or heating having a particular desired profile) takes place, even if the self-heating assembly 100 has been jostled about, for example, during shipping and handling prior to heater activation. Moreover, the support structure 114 substantially restricts movement of the granular second reactant 116 across (e.g., in a direction substantially parallel to the plane "A" in FIG. 1) the reaction space during the exothermic reaction, thereby further ensuring substantially uniform heating of the product to be heated.

As in the self-heating assembly 1200 of FIGS. 5-7, the support structure 114 in the self-heating assembly 100 of FIG. 1 can take the form of any number of possible materials, some of which include, for example, open cell foam, a non-woven material such as felt, a filter pad, a quilted tea bag material, deep flocking, a water-permeable honeycomb, deep-pile carpet, short lengths of tubing packed tightly together, a layered mass of tissue paper (e.g., with granules packed between layers), etc. In a particular implementation, including the one shown in FIG. 1, the support structure 114 is open cell foam.

In some implementations, the support structure 114 is compressible such that the product tray 102 compresses the support structure 114 when the product tray 102 is pressed down into the heater tray 106. Although in these instances the support structure 114 becomes compressed and, therefore, some of the granules moving up or down a bit relative to the trays, the granular second reactant 116, nevertheless, remains distributed substantially throughout the support structure 114 and the support structure 114 substantially restricts movement of the granules across the reaction space.

In some implementations, the support structure 114 has a degree of resistivity to vertical compression that enables it to be used to help press the liquid out of the frangible container after the frangible container has been ruptured.

In a typical implementation, some of the granules are held in place by the support structure itself. For example, in the case of open cell foam, some of the granules are wedged inside the open cells of the foam and held in place by virtue of being so wedged. Additionally, in a typical implementation, prior to heater activation, the support structure 114 is in close physical contact with its surrounding components (e.g., the product tray 102 above, the heater tray 106 at its sides, and the frangible container 110 below). This sort of arrangement can help prevent any loose granules (e.g., ones that are not held in place by the support structure 114 itself) from migrating around within the self-heating assembly (e.g., above, below or on the sides of the support structure 114).

In some implementations, the assembly 100 includes a cutting element (not shown in FIG. 1) to rupture the frangible container 110. In some implementations, moving the product tray 102 down toward the heater tray 106 may cause the frangible container 110 to rupture or, at least facilitate movement of the liquid first reactant 112 out of the ruptured frangible container 110 and into the support structure 114 to react with the granular second reactant 116.

Initiating an exothermic reaction in the illustrated assembly 100 typically involves rupturing the frangible container 110 and moving the product tray 102 down toward the heater tray 106. Rupturing the frangible container 110 opens the frangible container 110 so that the liquid first reactant 112 can escape the frangible container 110. Moreover, moving the product tray 102 down toward the heater tray 106 presses the liquid first reactant 112 out of the ruptured frangible container 110 so that it can flow into the support structure 114, where the granular second reactant 116 is located.

The liquid first reactant 112 can wick into and throughout the support structure 114 when it comes in contact with the support structure 114. The liquid first reactant contacts and reacts with the granular second reactant 116 as it moves through the support structure 114. Heat from the resulting exothermic reaction can, in certain instances, cause the liquid first reactant 112 (or at least certain portions of the liquid first reactant 112) to boil, rising up through the support structure 114, contacting the granular second reactant 116 along the way, and condensing against the bottom surface of the product tray 102, thereby transferring heat across the product tray 102 to increase the temperature of the product 104 contained therein.

In some implementations, the support structure 114 is a foamed material, such as open cell foam, which may be a solid, cellular structure that usually has a predominance of interconnected cells. The interconnected nature of the cells in the support structure 114 allow for the granular second reactant 116 to be dispersed and distributed throughout and supported by the support structure 114 structure.

The specific grain size of the granular second reactant 116 can vary. However, it is generally desirable for the granular second reactant 116 to be dispersed throughout the entirety of the support structure 114. Therefore, in a typical implementation, the grains are sized so that at least some of them will be able to pass into the open cellular structure of the support structure 114 and be supported within the structure and at least some of them will be supported atop the support structure 114 structure and not pass into any of the open cells, while allowing the first liquid reactant to pass through the support structure. In some implementations, the grain size is selected so that the grains are supported atop the support structure 114.

In some implementations, the support structure 114 extends entirely (or at least substantially entirely) across a width of the reaction space 108. In fact, in a typical implementation, the support structure 114 is sized so that its outer edges press relatively tightly against the inner sidewalls of the heater tray 106. Moreover, in a typical implementation, it is desirable for the density of granular second reactant 116 to be substantially uniform throughout the entirety of the support structure 114. This can help ensure substantially even heating of the product contained in the product tray 102 above the reaction space 108.

In a typical implementation, the design of the self-heating assembly 100 helps ensure that, when operated, substantially uniform heating occurs across the entire product tray 102.

There are a variety of possible ways to rupture the frangible membrane (of the frangible container 110. Generally speaking, any means for rupturing the frangible membrane should be simple, reliable and resist accidental activation. For example, some version of the self-heating assembly may include an internal cutting element configured to cut into (or rupture) the frangible membrane as the nested trays are moved toward one another. In another example, some version of the self-heating assembly may include an internal cutting element configured to cut into (or rupture) the frangible membrane that is operable (e.g., via a separate knob or the like) independent from the nested trays being moved toward one another. As yet another example, some versions of the self-heating assembly may be configured such that pressure from the nested trays being moved toward one another causes the frangible membrane of the frangible container to rupture.

There are also a variety of possible ways to move the nested trays 102, 106 toward each other. Generally speaking, any means for moving the nested trays toward one another should be simple, reliable and resist accidental activation. In some implementations, the possibility of accidental activation can be avoided or minimized by positioning one or more vertical posts (not shown in FIG. 1) between the outermost flanges 118, 120 of the nested trays 102, 106, so that it will be necessary to remove the vertical posts before the nested trays 102, 106 can be moved toward one another. A couple of exemplary means for moving the nested trays toward one another is shown in FIGS. 2 and 3, discussed below.

Figure 2:
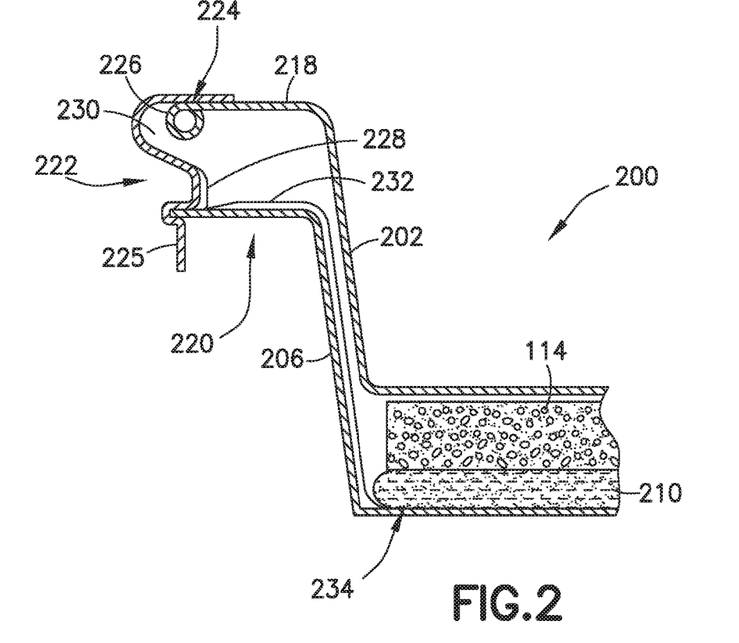
FIG. 2 is a partial, cross-sectional side view of an exemplary self-heating assembly an exemplary means for moving a product tray and a heater tray toward one another.
Figure 3:
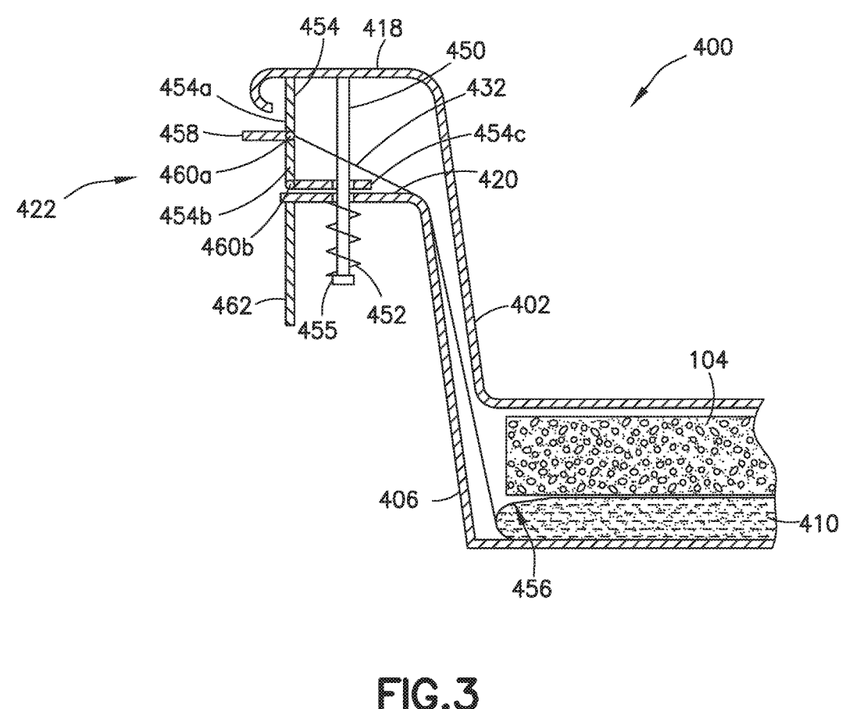
FIG. 3 is a partial, cross-sectional side view of an exemplary self-heating assembly with yet another ex exemplary means for moving a product tray and a heater tray toward one another.

FIG. 2 shows one exemplary means for moving a product tray 202 and a heater tray 206 toward one another in a self-heating tray assembly like the one shown in FIG. 1. More particularly, in the illustrated implementation, the means for moving the product tray 202 and the heater tray 206 is a latch-safety post device 222. The latch-safety post device 222, in the illustrated implementation, also helps maintain the nested trays 102, 106 at substantially fixed positions relative to one another prior to the self-heating tray assembly being activated.

In the illustrated example, the latch-safety post device 222 is securely connected (via solder bead 224) to an upper surface of the outer flange 218 of the product tray 202. From that connection point, the latch-safety post device 222 extends in an outward direction and wraps around the curled upper lip 226 at the end of the product tray's flange 218. Then, the latch-safety post device 222 extends inward. Then, the latch-safety post device 222 extends in a roughly downward direction to define a post 228 that extends between the product tray's flange 218 and the heater tray's flange 220. This post 228 maintains distance between the nested trays until the trays are urged together. Below the post 228, the latch-safety post device 222 extends outward again and wraps around the heater tray's flange 220. Finally, the latch-safety post device 222 extends in a roughly downward direction to form a tang 225.

In a typical implementation, the latch-safety post device 222 is sufficiently rigid to maintain the configuration shown prior to activation (e.g., during shipping and routine handling) of the assembly. However, in a typical implementation, the latch-safety post device 222 is able to flex under the application of an appropriate force (e.g., by a person pulling the tang 225 in an outward direction, or, in some implementations, simply pressing in a downward direction with a sufficient amount of downward force on an upper surface of the product tray flange, for example) until the post 228 can clear the heater tray's flange 220, thereby, freeing the product tray 202 to be moved in a downward direction toward the heater tray 206.

Moreover, in a typical implementation, and as represented in the illustrated implementation, the latch-safety post device 222 may be configured so as to define a space 230 between the bottom of the product tray's flange 218 and the latch-safety post device 222 that can receive the heater tray's flange 220 after the product tray 202 and the heater tray 206 have been pushed together. In a typical implementation, once the heater tray flange 220 is engaged in this space 230, the latch-safety post device 222 prevents subsequent separation of the product tray 202 and the heater tray 206.

The illustrated implementation also has pull wire 232, which in the illustrated implementation is tension tape, securely fastened to the latch-safety post device 222 near the bottom of the post 228. The pull wire 232 extends down between the product tray 202 and the heater tray 206 to a tilt-up toothed cutter 234, for example, which is below the frangible container 210. Since the initial motion required to activate the heater is a displacement of the tang 225 outward from the tray assembly 200 to unclip the latch-safety post device 222, the pull wire 232 is employed to compromise (e.g., rupture) the frangible container (e.g., fuel bag) by means of lifting the tilt-up toothed cutter 234 into the frangible container. In other implementations, the tilt-up toothed cutter 234 can be replaced by an adhesive patch that can be pulled off of the frangible container 210, or similar means for rupturing (e.g., opening) the frangible container 210.

In some implementations, a tamper-evident device, such as safety tape or a break-away plastic tab (not shown in FIG. 2) may be included to provide tamper-evidence.

FIG. 2 shows only one edge of the self-heating tray assembly 200 and only a single latch-safety post device 222 on that edge. However, some implementations may include more than one of the latch-safety post devices 222 at different points around the self-heating tray assembly 200. For example, in one implementation of the self-heating tray assembly in FIG. 2, there would be another latch-safety post device 222 on an opposite side of the self-heating tray assembly 200 that is similar or identical to the one shown in FIG. 2. To operate that kind of self-heating tray assembly, a person would typically take some action(s) to cause both of the latch-safety post devices to flex outward at the same time and push the product tray 202 down into the heater tray 206.

Other means for moving a product tray and a heater tray toward one another in a self-heating tray assembly are possible as well, some of which may include a spring-loaded mechanism that, when released, urges the nested trays toward one another, or the like.

FIG. 3 shows another exemplary means for moving a product tray 402 and a heater tray 406 toward one another in a self-heating tray assembly 400 like the one shown in FIG. 1. More particularly, in the illustrated implementation, the means for moving the product tray 402 and the heater tray 406 is a spring-loaded activation system 422. The spring-loaded activation system 422, in the illustrated implementation, helps maintain the nested trays 402, 406 at substantially fixed positions relative to one another prior to the self-heating tray assembly 400 being activated.

In the illustrated example, the spring-loaded activation system 422 includes a rod 450 that extends from the product tray flange 418 in a downward direction and passes through an opening in the heater tray flange 420. A portion of the rod 450 extends below the heater tray flange 420 and terminates at a spring retainer 455 at the distal end of the rod 450. A spring 452 is wrapped around the portion of the rod 450 that extends below the heater tray flange 420. The spring retainer 455 securely holds the bottom end of the spring 452, while the upper end of the spring contacts and pushes up against a bottom surface of the heater tray flange 420.

A post 454 is between and in contact with the product tray flange 418 and the heater tray flange 420. As shown, the post 454 is configured to maintain the product tray 402 and the heater tray 406 a fixed distance apart prior to activation. A pull-tab 458 extends in an outward direction from the post 454. The pull-tab 458 is generally configured so that pulling the pull-tab 458 causes the post 454 to collapse and move out from between the product tray flange 418 and the heater tray flange 420, thereby, freeing the product tray 402 and the heater tray 406 to move toward one another under influence of the spring 452.

The post 454 has an upper section 454a, a lower section 454b and an inwardly extending section 454c. The upper section 454a is connected to the lower section 454b by a first hinge 460a about which, the upper section 454a and lower section can swing relative to one another when the pull-tab 458 is pulled by a user in the outward direction. The lower section 454b is connected to the inwardly extending section 454c by a second hinge 460b about which the lower section 454b (and upper section 454a) can swing outward relative to the inwardly extending section 454c after the pull-tab 458 is pulled. This allows the portion of the post 454 that extends between the product tray flange 418 and the heater tray flange 420 to swing out from that space. The inwardly extending section 454c of the post 454 is coupled to the rod 450 (i.e., the rod 450 extends through an opening in the section 454c), which prevents the post 454 from falling off the self-heating tray assembly 400 after the pull-tab 458 is pulled.

A pull wire 432 extends from the removable post 454 to a tear patch 456 on the frangible container 410. In a typical implementation, the tear patch 456 is adhered to the outer surface of the frangible container 410 and covers/seals an opening in the frangible container 410. When the pull-tab 458 is pulled and the post 454 collapses and swings out from between the product tray flange 418 and the heater tray flange 420, the pull wire 432 compromises the tear patch 456 (e.g., tears it off the frangible container 410), thereby, allowing the first liquid reactant to flow out of the frangible container 410 through the opening.

Thus, in the illustrated implementation, simple removal of the post 454 compromises the frangible container 410 and releases the spring to squeeze the fuel (i.e., the liquid reactant) from the frangible container 410.

The illustrated arrangement also includes a skirt 462 that extends in a downward direction from a distal edge of the heater tray flange 420 to cover the portion of the rod 450 that extends below the heater tray flange 420 and to cover the spring 452 that surrounds that portion of the rod 450.

FIG. 3 shows only one edge of the self-heating tray assembly 400 and only a single spring-loaded activation system 422 on that edge. However, some implementations would include more than one spring-loaded activation system at different points around the self-heating tray assembly 400. For example, in one implementation of the self-heating tray assembly in FIG. 3, there would be another spring-loaded activation system (essentially identical to the one shown in FIG. 4) on an opposite side of the self-heating tray assembly 400. To operate this kind of self-heating tray assembly 400, a person would typically take some action(s) to cause both of the spring-loaded activation system 422 to operate.

Other means may be provided for moving of the product container and the heater container toward one another. This may be, for example, a press-down activator, a lever activator, a spring-loaded activator, or a rotary lever-latch activator.

FIGS. 4A-4F are partial views showing parts of an exemplary self-heating assembly that includes an exemplary means for rupturing a frangible container.

Figure 4A:
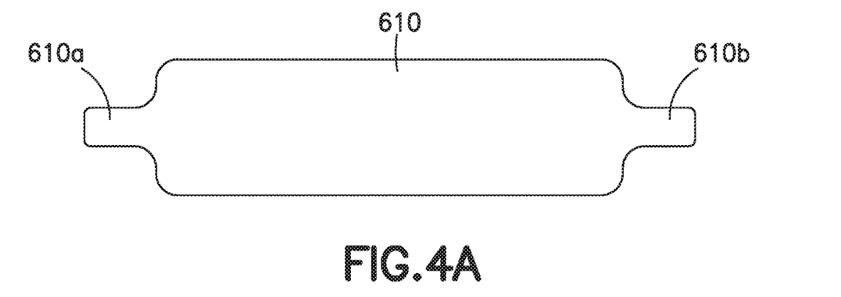
FIGS. 4A-4F are partial views showing parts of an exemplary self-heating assembly that includes an exemplary means for rupturing a frangible container.
Figure 4B:
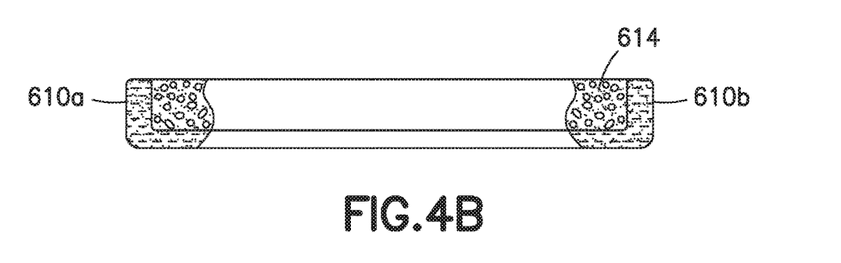
Figure 4C:
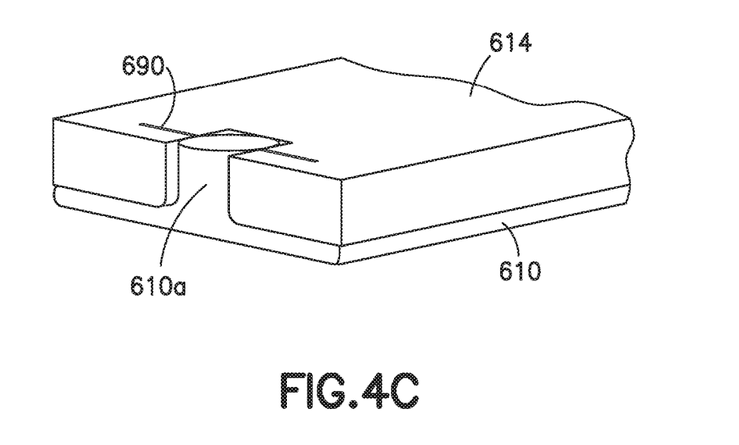
Figure 4D:
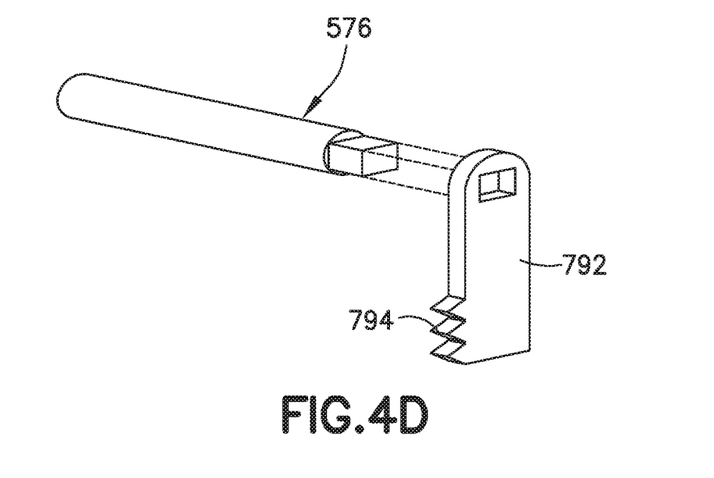

More particularly, FIG. 4A shows a view of an exemplary implementation of a frangible container 610 (containing a liquid first reactant) alone, and with a support structure 614 (containing granular second reactant), in FIGS. 4B and 4C.

In plan view (see FIG. 4A), the frangible container 610 has a substantially rectangular profile with a pair of extensions 610a, 610b at opposite ends, centrally disposed thereof. In a typical implementation, internally, the extensions 610a, 610b are internally open to the rest of the frangible container 610. As such, prior to being ruptured, the entire frangible container 610, including the extensions 610a, and 610b are filled with and contain the first liquid reactant.

The views in FIGS. 4B and 4C show that, when in place within a self-heating container assembly, each extension 610a, 610b is bent upward from a plane otherwise occupied by other portions of the frangible container 610 and into a plane substantially occupied by the support structure 614. Moreover, as shown in FIG. 4C, there are slots 690 in an upper surface of the support structure 614, each of which lines up with one of the extensions (e.g., 610a). In the illustrated example, one slot is on one side of the corresponding extension (e.g., 610a) and the other slot is on the other side of the corresponding extension (e.g., 610a).

In a typical implementation of a self-heating assembly that includes the arrangement shown in FIG. 4C, there will be a cutting element 792 (e.g., at the end of an axle 576, see FIG. 4D) with cutting blades 794 configured to move through the slot(s) 690 in the support structure 614 and rupture the frangible container, more particularly, the extension (e.g., 610a) of the frangible container 610. The axle 576 (or rotatable lever) may be physically connected to a knob (exposed outside the heating assembly for manipulation by a user) or to some other activating mechanism that causes it to move, at an appropriate time, through the extension 610a of the frangible container 610.

In some implementations, pressure placed on the foam and the frangible container 610 during assembly of the self-heating assembly may cause the extensions to inflate or extend into the recesses in the foam so that the extensions will be located properly for the swinging cutter arm.

Figure 4E:
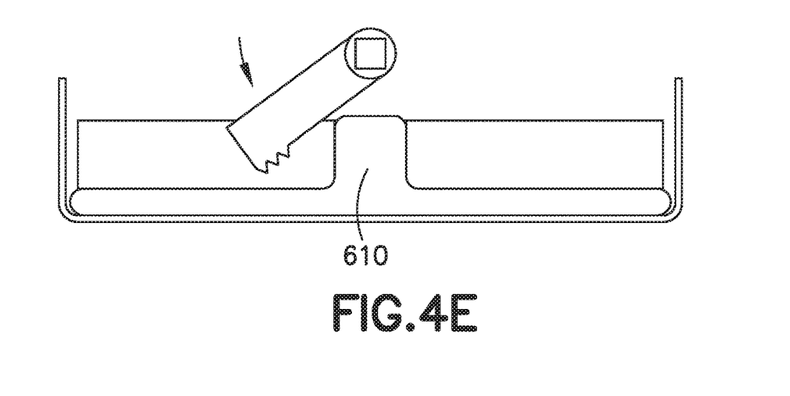

FIG. 4E is a partial cutaway side view of a self-heating assembly showing how the cutter element 792 swings about an axis 793 so that the cutting blades 794 will cut through (and rupture) the extension 610a of the frangible container.

Figure 4F:
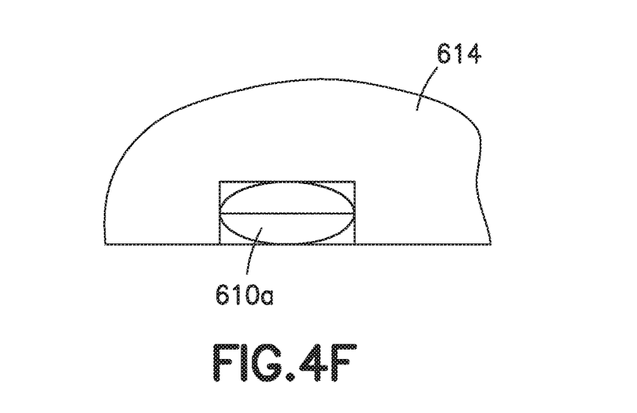

FIG. 4F is a shows a top view of the support structure 614 and the extension 610a, with a line through the extension 610a showing the path of travel of a cutting blades (e.g., 794) as it ruptures the extension 610a.

In some implementations, the self-heating assembly will include two identical latches that need to be operated in order to initiate heating, one on either end of the self-heating assembly. In these implementations, in order to operate the two latches simultaneously it may be necessary or desirable to place the self-heating assembly on a firm surface and then use both hands to activate the heater. However, some implementations may require only one hand to activate the heater. For example, one-handed activation can be accomplished by hinging the two trays together at one end and providing a single latch at the other. Since the liquid bag would then be loaded asymmetrically by the foam and would lie in a wedge shape in the bottom of heater tray, a single activation lever or activation device acts over twice the distance required by the symmetrical two-lever system. However, in the sample tests, the total amount of travel of the symmetrical system was only about 0.16 inches, a single-ended system with the same chemical energy content per unit area would require a take up of only a little over 0.3 inches.

Tests of the concepts disclosed herein have been performed, employing several foam pore sizes and pad thicknesses. The test hardware consisted of two identical steel bread baking trays with interior dimensions of approximately 3.2 inches wide by 5.8 inches long by 1.8 inches deep. A foam pad was fit into the tray closely and was about 0.44 inches thick. A foam material was chosen which is dimensionally stable in boiling water. The pad was sealed on the edges to prevent leakage of the granular material to the sides. The granular material weighed about 58 grams, and filled the foam only about 0.13 inches deep. The remaining foam volume was required for the volume increase of the ingredients during boiling. The amount of fuel was 54 cc. When placed in a bag with the same area as the base of the tray this layer of liquid was about 0.16 inches deep. Upon puncturing this bag to activate the heater, it was only necessary to move the upper tray 0.16 inches downward to press substantially all of the fuel out of the bag. In a typical test the chemical ingredients provided were capable of producing about 11,000 calories. The simulated food product in the upper tray was 250 cc of water. Heating curves, showing water temperature over time, produced by two of these proof-of-concept tests, are shown in the accompanying FIG. 8.

The portion of the knob assembly that is exposed for manipulation by a user can have any one of variety of different configurations, from very simple to more complex. In one exemplary implementation, the portion of the knob assembly that is exposed for manipulation by a user may include a disk-shaped portion that is split down the middle by a plastic hinge. The upper part of the disk-shaped portion may be bendable about the hinge relative to the lower part of the disk-shaped portion from a locked position to an unlocked position. In the locked position, the upper part of the disk-shaped portion may lie in the same plane as the lower part of the disk-shaped portion. Moreover, in some implementations, the upper part of the disk-shaped portion may be secured in this position by one or more break-away tab locks (e.g., thin areas of molded plastic) that extend from the upper part of the disk-shaped portion to a stationary portion of the assembly to prevent accidental movement out of the locked position. In a typical implementation, the break-away tabs are easy to break (e.g., by hand) and provide some degree of tamper-evidence protection to the self-heating assembly.

A number of embodiments of the invention have been described. Nevertheless, it will be understood that various modifications may be made without departing from the spirit and scope of the invention.

For example, the relative and absolute sizes of the various sub-components can vary considerably. A variety of materials are usable to form each sub-component and the heating reactants.

The support structure can be virtually any kind of structure that is able to perform the functionalities described herein and attributed to the support structure.

The size of the tray (e.g., diameter or edge-to-opposite edge dimension) can vary. For example, it can be at least 4 inches, at least 5 inches, at least 6 inches, or even larger. In general, the larger the diameter or edge-to-opposite edge dimension, the more significant it is to maintain the granular reactant distributed evenly throughout the self-heating assembly.

There are a variety of ways that the frangible container could be ruptured. Moreover, a variety of different cutting elements could be used.

In various implementations, other (or different) types of tamper-evidence protection can be provided. Generally speaking, tamper-evidence protection provides an indicator or barrier to entry which, if breached or missing, can reasonably be expected to provide visible evidence to consumers that tampering has occurred. Examples of tamper-evidence protection can include, for example, break-away tabs, plastic wrap around external portions of the knob assembly, etc.

It should be understood that relative terminology used herein, such as "upper", "lower", "above", "below", "front", "rear", etc. is solely for the purposes of clarity and is not intended to limit the scope of what is described here to require particular positions and/or orientations. Accordingly, such relative terminology should not be construed to limit the scope of the present application. Additionally, the term substantially, and similar words, such as substantial, are used herein. Unless otherwise indicated, substantially, and similar words, should be construed broadly to mean completely and almost completely (e.g., for a measurable quantity this might mean, for example, 99% or more, 95% or more, 90% or more, or 85% or more).

For example, the granular second reactant is described as being distributed or dispersed, with substantial uniformity, throughout the support structure. In some implementations, this may mean that the density of grains in multiple equal volumes of support structure (e.g., cubic centimeters) does not vary more than 15%. As another example, the support structure is described as supporting and substantially maintaining the distribution of the granular second reactant throughout the support structure before and during the exothermic chemical reaction. In some implementations, this may mean preventing shifting of grains (of the granular second reactant) so as to maintain the substantial uniformity of distribution.

For non-measurable quantities (e.g., a surface that is substantially parallel to another surface), substantial should be understood to mean completely or almost completely (e.g., deviating from parallel no more than a few (e.g., less than 3, 4 or 5) degrees.

Other implementations are within the scope of the claims.

What is claimed is:

1. A self-heating assembly comprising:
  a product container for holding a product to be heated;
  a heater container coupled to the product container;
  a reaction space between the product container and the heater container;
  an open cell foam support structure in the reaction space;
  a granular second reactant distributed throughout the open cell foam support structure;

a liquid first reactant in the reaction space; and
a frangible membrane in the reaction space configured so that, when intact, it separates the liquid first reactant from the open cell foam support structure and from the granular second reactant,
wherein the liquid first reactant and the granular second reactant are adapted to exothermically react upon contact with one another,
wherein the open cell foam support structure is permeable to the liquid first reactant and is configured to support and substantially maintain the distribution of the granular second reactant throughout the open cell foam support structure before and during the exothermic chemical reaction, and
wherein individual granules of the second granular material have grain sizes that result in the individual granules being supported atop the open cell foam support structure.

2. The self-heating assembly of claim 1, wherein the frangible membrane is above the open cell foam support structure in the reaction space.

3. The self-heating assembly of claim 1, wherein the frangible membrane is below the open cell foam support structure in the reaction space.

4. The self-heating assembly of claim 1, wherein the open cell foam support structure extends across an entire width of the reaction space.

5. The self-heating assembly of claim 4, wherein the granular second reactant is dispersed, substantially uniformly, across an entire width of the open cell foam support structure so as to produce substantially even heating across the entire width of the reaction space when the liquid first reactant and the granular second reactant exothermically react.

6. The self-heating assembly of claim 1, wherein the product container and the heater container are movable toward one another to reduce a volume in the reaction space and to urge the liquid first reactant into the open cell foam support structure.

7. The self-heating assembly of claim 1, further comprising a cutting element that is moveable to rupture the frangible membrane.

8. The self-heating assembly of claim 7, wherein the cutting element is configured such that when the product container and the heater container are moved toward one another, the cutting element also moves to rupture the frangible membrane.

9. The self-heating assembly of claim 7, wherein the cutting element is configured to move through a slot in the open cell foam support structure as it moves to rupture the frangible membrane.

10. The self-heating assembly of claim 9, further comprising:
a handle coupled to the cutting element and exposed for manipulation by a user,
wherein manipulation of the handle causes the cutting element to move through the slot in the open cell foam support structure to rupture the frangible membrane and causes the product container and the heater container to move toward one another.

11. The self-heating assembly of claim 1, wherein the frangible membrane is part of a frangible container that, when intact, contains the liquid first reactant.

12. The self-heating assembly of claim 11, wherein the frangible container has an extension that is bent upward from a plane occupied by other portions of the frangible container and into a plane occupied by the open cell foam support structure, and
wherein a cutting element is configured to rupture the extension of the frangible container.

13. The self-heating assembly of claim 7, wherein the cutting element comprises:
a shaft that extends at least partially across the reaction space between the frangible membrane and the open cell foam support structure; and
one or more cutting blades attached to the shaft,
wherein the shaft, with the attached one or more cutting blades, is rotatable about an axis of the shaft, such that said rotation causes the one or more cutting blades to pierce a surface of the frangible membrane.

14. The self-heating assembly of claim 13, further comprising:
a knob exposed for manipulation by a user at an outer surface of the self-heating assembly, wherein the knob is physically attached to the shaft.

15. The self-heating assembly of claim 14, wherein the shaft is supported, at an end opposite the knob, by a bearing at an inner surface of the reaction space.

16. The self-heating assembly of claim 1, further comprising a means for moving the product container and the heater container toward one another.

17. The self-heating assembly of claim 16, wherein the means for moving of the product container and the heater container toward one another is selected from the group consisting of: a press-down activator, a lever activator, a spring-loaded activator, and a rotary lever-latch activator.

18. The self-heating assembly of claim 1, wherein the product container and the heater container are both trays or both bowls.

19. The self-heating assembly of claim 1, further comprising a food product in the product container.

20. The self-heating assembly of claim 1, wherein some granules of the granular second reactant are wedged inside open cells of the open cell foam and held in place by virtue of being so wedged.

21. The self-heating assembly of claim 20, wherein the open cell foam support structure extends entirely across a width of the reaction space, such that outer edges of the open cell foam support structure press relatively tightly against inner sidewalls of the heater container to help prevent any loose granules from migrating around within the self-heating assembly.

22. The self-heating assembly of claim 1, wherein the open cell foam support structure substantially restricts movement of the granular second reactant side-to-side in the reaction space during the exothermic chemical reaction.

23. The self-heating assembly of claim 1, wherein the open cell foam support structure is a solid, cellular structure that has a predominance of interconnected cells, and
wherein the interconnected cells enable the granular second reactant to be dispersed and distributed throughout and supported by the open cell foam support structure.

24. A self-heating assembly comprising:
a product container for holding a product to be heated;
a heater container coupled to the product container;
a reaction space between the product container and the heater container;
an open cell foam support structure in the reaction space;
a granular second reactant distributed throughout the open cell foam support structure;
a liquid first reactant in the reaction space; and a frangible membrane in the reaction space configured so that, when intact, it separates the liquid first reactant from the open cell foam support structure and from the granular second reactant, wherein the liquid first reactant and the granular second reactant are adapted to exothermically react upon contact with one another, wherein the open cell foam support structure is permeable to the liquid first reactant and is configured to support and substantially maintain the distribution of the granular second reactant throughout the open cell foam support structure before and during the exothermic chemical reaction, and wherein individual granules of the second granular material are sized so that at least some of the individual granules are able to pass into an open cellular structure of the open cell foam support structure and be supported within the open cell foam support structure and at least some of the individual granules are supported atop the open cell foam support structure without passing into any open cell of the open cell foam support structure.

25. A self-heating assembly comprising:
a product container for holding a product to be heated;
a heater container coupled to the product container;
a reaction space between the product container and the heater container;
an open cell foam support structure in the reaction space;
a granular second reactant distributed throughout the open cell foam support structure;
a liquid first reactant in the reaction space; and
a frangible membrane in the reaction space configured so that, when intact, it separates the liquid first reactant from the open cell foam support structure and from the granular second reactant, wherein the liquid first reactant and the granular second reactant are adapted to exothermically react upon contact with one another, and wherein the open cell foam support structure is permeable to the liquid first reactant and is configured to support and substantially maintain the distribution of the granular second reactant throughout the open cell foam support structure before and during the exothermic chemical reaction, wherein the open cell foam support structure extends entirely across a width of the reaction space, such that outer edges of the open cell foam support structure press relatively tightly against inner sidewalls of the heater container, wherein some granules of the granular second reactant are wedged inside open cells of the open cell foam and held in place by virtue of being so wedged, wherein individual granules of the second granular material are sized so that at least some of the individual granules are able to pass into an open cellular structure of the open cell foam support structure and be supported within the open cell foam support structure and at least some of the individual granules are supported atop the open cell foam support structure without passing into any open cell of the open cell foam support structure.

* * * * *